United States Patent [19]

Obara

[11] Patent Number: 4,465,914
[45] Date of Patent: Aug. 14, 1984

[54] WIRE-CUT, ELECTRIC DISCHARGE MACHINING METHOD FOR AUTOMATICALLY MEASURING A REQUIRED OFFSET VALUE

[75] Inventor: Haruki Obara, Sagamihara, Japan

[73] Assignee: Fujitsu Fanuc Limited, Tokyo, Japan

[21] Appl. No.: 249,844

[22] Filed: Apr. 1, 1981

[30] Foreign Application Priority Data

Apr. 16, 1980 [JP] Japan ............................... 55-49941

[51] Int. Cl.³ .............................................. B23P 1/08
[52] U.S. Cl. ............................... 219/69 W; 219/69 M
[58] Field of Search ............... 219/69 W, 69 M, 69 R, 219/69 V, 68, 69 G

[56] References Cited

U.S. PATENT DOCUMENTS 4,324,970  4/1982  Nanasawa et al. ............... 219/69 W
4,366,360  12/1982  Inoue .................................. 219/69 W

FOREIGN PATENT DOCUMENTS 39892  3/1977  Japan ................................ 219/69 W
83192  7/1978  Japan ................................ 219/69 W
31529  3/1980  Japan ................................ 219/69 W Primary Examiner—M. H. Paschall
Attorney, Agent, or Firm—Staas & Halsey

[57] ABSTRACT

During machining of a workpiece, the feed of the wire electrode and the discharge for the machining are stopped and the wire electrode is moved in a direction perpendicular to the machining path until it contacts the wall of the workpiece. The size of the spark gap is then detected from the position where the wire electrode contacts the workpiece. A desired offset value is calculated from the detected size of the spark gap and the known wire diameter. The machining path is corrected so that the center of the wire electrode lies at a position offset by the desired offset value relative to a desired profile.

1 Claim, 5 Drawing Figures

WIRE-CUT, ELECTRIC DISCHARGE MACHINING METHOD FOR AUTOMATICALLY MEASURING A REQUIRED OFFSET VALUE

BACKGROUND OF THE INVENTION

1. Field of the Invention

The present invention relates to a wire-cut, electric discharge machining method, and more particularly to a wire-cut, electric discharge machining method which automatically measures the offset value required by using the wire electrode to measure the size of a wire electrode spark gap, and which machines the workpiece while correcting the machining path in accordance with the measured offset value.

2. Description of the Prior Art

Wire-cut, electric discharge machining methods machine a workpiece by producing a discharge between a wire electrode and the workpiece. In using such methods, it is necessary that the center of the wire electrode be disposed at a position offset from the desired profile of the workpiece by a distance corresponding to the sum of one half of the wire diameter plus the size of the spark gap. The spark gap varies in size depending upon the voltage and current necessary for machining the material and the thickness of the workpiece. The desired offset value also differs for each machining operation and undergoes a further change during the actual machining operation. To compensate for these changes in offset value, it is the general practice of the prior art to predetermine the offset value of each portion of the workpiece by performing test machining prior to main machining, but this practice is very troublesome.

For example, as shown in FIG. 1, when cutting a circular arc shape by wire-cut, electric discharge machining, the radius of curvature of an actually machined shape 10 becomes smaller than that of the intended configuration 11. Such an error may be caused by a delay in the machining path due to sagging of the wire electrode under the pressure of discharge in the dielectric fluid, or by a difference in the quantity of machining between the two side walls of the workpiece because of their different radii of curvature; but the precise cause has not yet been determined. In order to avoid such a configuration error, the prior art adopts a method of pre-correcting the machining path when the NC tape is prepared. However, this method is defective in that much time is required for the correction and, when the workpiece or machining condition is changed, the correction must also be altered.

SUMMARY OF THE INVENTION

It is an object of the present invention to provide a wire-cut, electric discharge machining method which is capable of automatically measuring the offset value requires during machining and which permits accurate machining of, e.g., a circular arc shape, by correcting the machining path in accordance with the measured offset value.

Briefly stated, in the wire-cut, electric discharge machining method of the present invention, the feed of the wire electrode and the discharge are stopped during machining and the wire electrode is moved in a direction perpendicular to the machining path until it contacts the wall of the workpiece, thereby detecting the size of the spark gap. The offset value is calculated from the detected size of the spark gap and the wire diameter (which is already known). The machining path is then corrected so that the center of the wire electrode lies at a position by the desired offset value relative to the profile to be cut.

DESCRIPTION OF THE PREFERRED EMBODIMENTS

Figure 1:
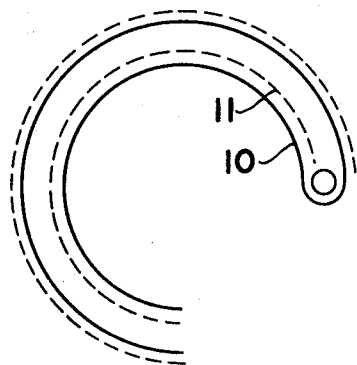
FIG. 1 is a schematic diagram showing an error occurring in the machining of a circular arc portion.
Figure 3:
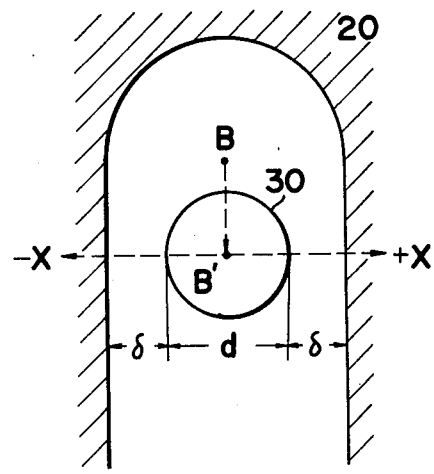
FIGS. 2 and 3 are schematic diagrams showing an embodiment of the present invention.
Figure 2:
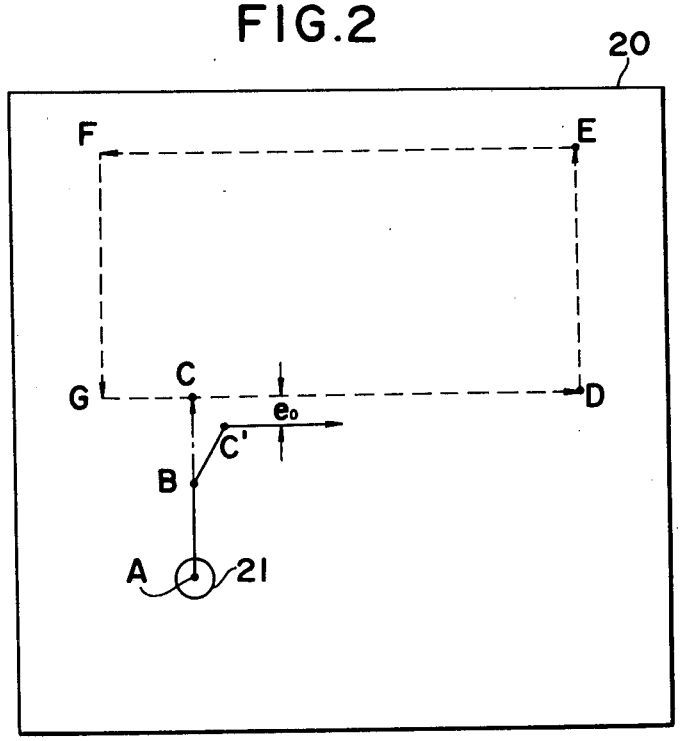

FIGS. 2 and 3 are explanatory of an embodiment of the present invention, in which (1) a required offset value is automatically measured in a premachining path, (2) the operation proceeds to the machining of a desired shape, and (3) the main machining is performed in accordance with the measured offset value. In FIGS. 2 and 3, reference numeral 20 indicates a workpiece; 21 designates a machining start hole; A identifies a machining start point; B denotes an offset measuring position; C-D-E-F-G-C represents the machining path; C' shows an offset end position; $e_0$ refers to a reference offset value; 30 indicates a wire electrode; d designates the wire diameter; $\delta$ identifies the size of the spark gap; and +X and −X denote directions in which the wire electrode 30 is moved for the detection of the offset.

In FIG. 2, assuming that a move command given by the command tape to the numerical control unit is "A→B→C→D→E→F→G→C" and that the portion including and surrounding the machining path D to G is the workpiece 20, the workpiece is machined first from the point A to B without offset and, at point B spaced a predetermined distance apart from the point A (for example one half the distance between A and C) apart from the point A, the feed of the wire electrode 30 and the discharge are stopped. In this state, since the wire electrode 30 is free from sagging or displacement due to the pressure of the discharge, a short is likely to occur between the wire electrode 30 and the workpiece 20; therefore, it is desirable to move the wire electrode 30 back from the point B to B' as shown in FIG. 3. The distance between the points B and B' is preferably about 0.1 mm.

Next, the wire electrode 30 is moved perpendicularly to the machining path A→C until it contacts the wall surface of the workpiece 20 and, from the position of contact therewith, the size $\delta$ of the spark gap is detected. The detection of the contact between the wire electrode 30 and the workpiece 20 is achieved using, for example, a contact sensor circuit of the type applying a voltage across the wire electrode 30 and the workpiece 20. Then, a required offset value e is calculated from the (already known) wire diameter d and the measured size $\delta$ of the spark gap using the following expression:

$$e = (d/2) + \delta \qquad (1)$$

It is desirable that the detection of the required offset value be repeated several times to obtain an average. In the aforementioned backward movement of the wire electrode 30, a distance $\epsilon$, from the machining stop point to the point where the short between the wire electrode 30 and the workpiece 20 is removed, is measured and stored in the NC memory. Next, the offset value obtained by the above calculation is stored as the reference offset value $e_0$ in an internal memory and the machining is resumed, gradually increasing the offset value so that the center of the wire electrode 30 lies at a position offset by the reference offset value $e_0$ relative to the profile desired to be cut, thus correcting the machining path to B→C'.

As described above, according to this embodiment, (1) the desired offset value is automatically detected in the premachining path, (2) the operation proceeds to the machining of a desired profile, and (3) the main machining is carried out in accordance with the detected offset value. Accordingly, there is no need of pre-determining the offset value through test machining prior to main machining, thus permitting, easier operation of the wire-cut, electric discharge machine than was known in the prior art.

Figure 4:
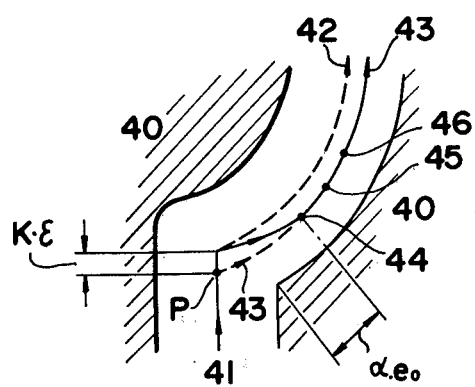
FIGS. 4 and 5 are schematic diagrams showing another embodiment of the present invention.

FIG. 4 is a schematic diagram explaining another embodiment of the present invention. In FIG. 4, reference numeral 40 indicates a workpiece; 41 designates a premachining path; 42 identifies a reference offset path; 43 denotes a corrected offset path; and 44 and 46 represent offset decision positions.

If a circular arc shape is machined on the basis of the reference offset value $e_0$ obtained in the premachining path, the radius of the resulting circular arc decreases and causes an error. In general, this error $\lambda$ is a function of the radius r of the circular arc and the sag distance $\epsilon$ of the wire electrode. The error is approximately represented by the following expression:

$$\lambda = a \frac{\epsilon_0 + b^m}{r^n} \quad (2)$$

where a, b, m, n and $\epsilon_0$ are constants. The error $\lambda$ can substantially be corrected by calculating the value of the error $\lambda$ in the numerical control unit, or reading out the value $\lambda$ entered in the numerical control unit or the like when programming the machining path, and by following the corrected offset path 43 so that its radius of curvature becomes larger than that of the reference offset path 42, for example, as shown in FIG. 4.

However, when the accuracy of the expression (2) is low, the error $\lambda$ cannot satisfactorily be corrected. This embodiment is intended to provide a method which is effective in such a case. Namely, where the wire electrode shifts to circular arc machining from pre-machining along the straight or curved path 41, an overcut by the distance K·$\epsilon$ takes place at the intersection P of the premachining path 41 and the corrected offset path 43, and the wire electrode returns to the corrected offset path 43 after travelling a distance $\alpha \cdot e_0$, as depicted in FIG. 4. Here, $\epsilon$ is the amount of sag of the wire electrode; $e_0$ is the aforementioned offset value; and K and $\alpha$ are constants. The value of the constant K is between 0 and 1; preferably about 0.5 to 0.8 when the portion inside the circular arc is to be the machined product, and about 0.2 to 0.5 when the portion outside the circular arc is to be the machined product. It is preferred that the value of the constant $\alpha$ be approximately 1 to 2. The amount of sag $\epsilon$ of the wire electrode can be detected by moving the wire electrode back during machining and by deciding where the short between the wire electrode and the work has been removed. Such detection can be effected simultaneously with the measurement of the required offset value e in FIG. 3.

When the wire electrode has returned to the corrected offset path 43, the required offset value is automatically measured at that point by the same method used in the foregoing embodiment, thereby determining a new required offset value. The machining path is corrected to have the required offset vaue at a point spaced from the aforesaid point a very small distance, for example, a distance substantially corresponding to the offset value, and then a required offset value at that point is detected; thereafter, such detection is repeated several times. When the detected offset values have fallen within a certain range, a final offset value is determined and this circular arc portion is machined following the final offset value thus obtained.

Figure 5:
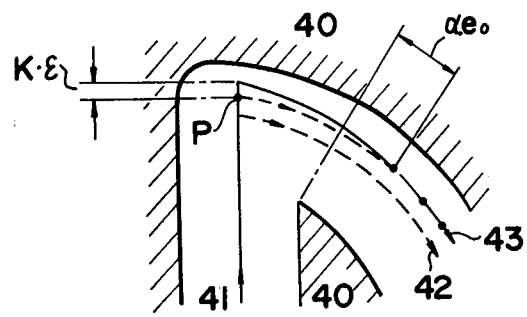

With the method described above, since the offset value is automatically corrected to perform machining in a desired shape, circular arc shapes and the like can accurately be machined without involving cumbersome operations. This method is also applicable where the pre-machining path 41 is followed by a circular arc portion at an acute angle as depicted in FIG. 5.

As has been described in the foregoing, according to the present invention, the feed of the wire electrode and the discharge are stopped during machining; the wire electrode is moved perpendicularly to the machining path until it comes contacts the wall of the workpiece and the size of the spark gap is detected from the position where the wire electrode is in contact with the workpiece; a desired offset value is calculated from the size of the spark gap thus detected and the preknown wire diameter; and the machining path is corrected so that the center of the wire electrode lies at a position offset by the offset value relative to a desired profile to be cut. Since the required offset value need not be pre-determined throughout machining prior to main machining, operability of the wire-cut, electric discharge machine is enhanced and the machining accuracy of a circular arc portion is increased.

It will be apparent that many modifications and variations may be effected without departing from the scope of the novel concepts of this invention.

What is claimed is:

1. A wire-cut, electric discharge machining method for machining a workpiece from a first position on the workpiece to a second position on the workpiece into a desired shape having a curve, comprising the steps of:
   (a) stopping the feed and de-energizing a wire electrode;
   (b) moving the wire electrode in a direction perpendicular to a machining path until it contacts the wall of a workpiece at the first position;
   (c) detecting the size of a spark gap at a third position of contact of the wire electrode with the workpiece between the first position and the second position;
   (d) determining an offset value from the detected size of the spark gap and the dimensions of the wire electrode while the wire is de-energized;
   (e) correcting the path so that the center of the wire electrode lies at a position offset by the offset value; and
   (f) repeating steps (c), (d) and (e) in order, a plurality of times between the third position and the second position, wherein each of the steps (a)-(f) occurs during machining of the workpiece into the desired shape.

* * * * *

UNITED STATES PATENT AND TRADEMARK OFFICE
CERTIFICATE OF CORRECTION

PATENT NO. : 4,465,914

DATED : 8/14/84

INVENTOR(S) : Obara

It is certified that error appears in the above-identified patent and that said Letters Patent is hereby corrected as shown below:

Col. 1
Line 56, "requires" s/b --required--.

Col. 2
Line 2 after "position" insert --offset--;
      after "desired" delete --offset--.
Line 38, delete "apart";
Line 39, delete "from the point A".

Col. 3
Line 16, "permitting," s/b --permitting--;
Line 53, "premachining" s/b --pre-machining--.

Col. 4
Line 8, "vaue" s/b --value--;
Line 28, delete "comes".

Signed and Sealed this

Twenty-sixth Day of February 1985

[SEAL]

Attest:

DONALD J. QUIGG

Attesting Officer     Acting Commissioner of Patents and Trademarks